UNITED STATES PATENT OFFICE.

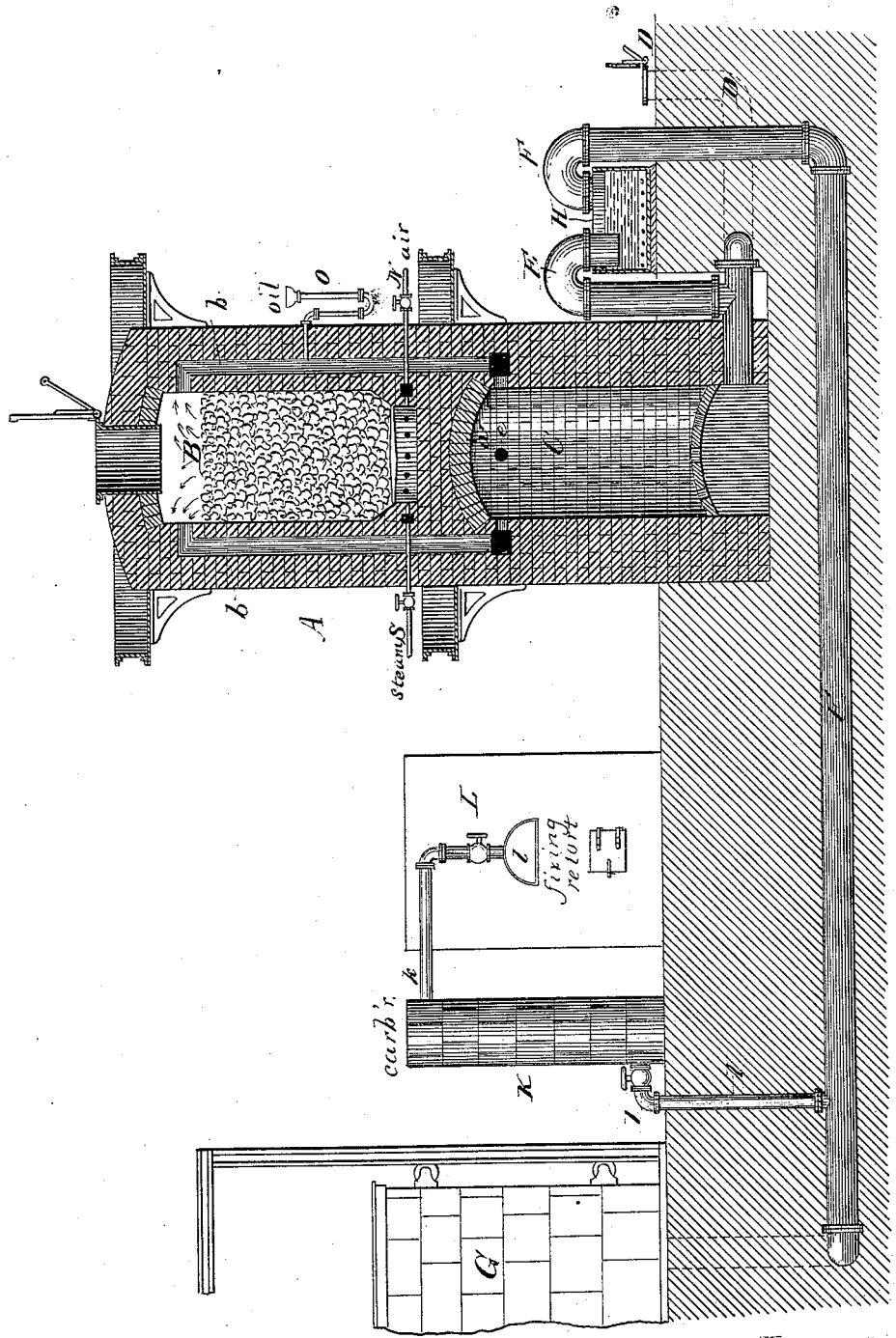

THEODORE G. SPRINGER, OF NEW YORK, N. Y.

PROCESS OF MANUFACTURING ILLUMINATING-GAS.

SPECIFICATION forming part of Letters Patent No. 287,185, dated October 23, 1883.

Application filed September 15, 1883. (No model.)

*To all whom it may concern:*

Be it known that I, THEODORE G. SPRINGER, of the city of New York, in the county of New York and State of New York, have invented certain new and useful Improvements in the Process of Manufacturing Illuminating-Gas; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to the manufacture of illuminating-gas by first decomposing steam in contact with incandescent or highly-heated carbon in a generating-furnace, producing hydrogen and carbonic oxide or "water-gas;" second, carbureting such gas with hydrocarbon oil or liquid, and, third, converting the carbureted mixture into a fixed gas by subjecting it to the proper temperature in a heated chamber; and the object of the invention is to utilize the heat and heating-power of the waste gaseous products arising from the decomposing and generating furnace for heating up the carbureting and fixing chamber, and therein carburet the water-gas and combine hydrocarbons with it, so as to form a fixed illuminating-gas of a mixed or low grade, and subsequently to perfect this gas and make it of a uniform candle-power and of the finest quality before passing it to the purifiers and distributing-holder, from which it is supplied to the consumer.

In one of the systems of manufacturing illuminating-gas, as now practiced, the carbonic-oxide gas arising from the generator at the time the air-blast is admitted for raising the contained body of carbonaceous fuel to incandescence is wasted, being allowed to burn in the open air above the generating-cupola. It is estimated that the heat wasted in this operation is greater than the heat developed and stored in the generator, so that more than half of the heating-power of the fuel is wasted. Furthermore, in this system the water-gas produced by the decomposition of steam in the cupola-generator or "gasogene" must be separately carbureted, and the entire quantity of hydrocarbon oil required for that purpose, amounting to about five gallons per thousand cubic feet of gas treated, must be decomposed and combined with the gas in separately heated retorts, requiring a great extent of heating-surface and a large amount of fuel, with consequent large expense for plant and operation of the process. By reason of these features of expense this process has proved objectionable and unsatisfactory. By my improved process the heat of the waste gases from the generating-chamber and the heat developed by the combustion of the carbonic oxide in such gases is stored in refractory material contained in a carbureting and fixing chamber, and is subsequently used for decomposing hydrocarbon oil or liquid and combining the resulting rich gas with the water-gas arising from the generator while steam is being decomposed, producing an illuminating-gas of varying quality without regard to candle-power, and this mixed or low-grade gas is partially or wholly stored in a holder separate from the distributing-holder, and is afterward carbureted to the desired candle-power, and then converted into a fixed gas of uniform candle-power and of the finest quality in properly-heated retorts or any properly-heated fixing-chamber. The mixed-grade illuminating-gas may be carbureted in a separate carburetor or chamber and then conducted to the heated fixing-chamber; or the carbureting-fluid may be added to it in the heated chamber, where a fixed gas is produced. A portion of the mixed grade of gas may be conducted, while hot, directly into the chamber, where it is carbureted, and then into the hot retorts, where it is fixed, the surplus being generated going to the storage-holder for mixed or low grade gas.

It has been found difficult to produce a uniform quality of illuminating-gas of the desired candle-power in the carbureting and fixing chamber of the cupola-generator on account of the varying temperature from high to low of such chamber, and also on account of the varying volume of water-gas passed into such chamber; but the large volume of heat now wasted in the system above mentioned, if stored in a fixing-chamber, may be very effectively utilized for decomposing at least four-fifths of the hydrocarbon liquid required and combining it with the water-gas to produce illuminating-gas, for all the decomposition effected in this way is a clear gain in heat, a large gain in time, and results in much saving in the extent of plant required. It has therefore been found preferable to add as much oil or hydrocarbon liquid as possible to the gas in the fixing-chamber of the cupola without incurring the risk of its reduction to lamp-black or hard carbon during the first part of the run, when the heat is high, or the danger of its running to tar during the last part of the run, when the temperature is low in the fixing-chamber, and to store the whole volume of the resulting mixed or low grade illuminating-gas in a separate holder, which may be called the "governing-holder," and subsequently pass it in a regulated stream to the carbureting-chamber, where the small additional quantity of hydrocarbon liquid or oil or vapor required is mixed with it, and then convert it into a homogeneous fixed gas in a heated retort or chamber maintained at the required temperature. I thus gain great advantages over the process in which water-gas only is produced in the generating-cupola and sent direct to a holder, then returned to a chamber, where it is carbureted, and then passed to heated retorts, where it is fixed, as in my process the heat of the generating-cupola is saved and stored in refractory material, where it is utilized for decomposing oil and fixing gases, so that when the gas, after storage in the governing-holder, is passed to the hot retorts or fixing-chamber of a cupola and converted into a uniform candle-power illuminating-gas, very little oil is required, and consequently but little heat is absorbed from the hot benches of retorts or other fixing-chamber, the large proportion of the required oil or carbureting-fluid having been decomposed and combined with the hot water-gas in the generating-cupola where the water-gas was produced. In the system in which the water-gas is cooled and stored and then carbureted, at least five gallons of oil or carbureting-fluid must be added to each one thousand feet of gas to produce a twenty-five candle-power illuminating-gas. The oil-vapor thus added must all be decomposed in the independently-heated retorts, and absorbs during the decomposition a large amount of heat, requiring a large amount of fuel to maintain the proper temperature, and entailing a consequent large expense. Now, in my improved process four-fifths of the five gallons of oil or carbureting-fluid required for carbureting is decomposed by heat stored from the waste gases at the time the fuel in the generator is being raised to incandescence. Therefore the set of retorts heated to produce a uniform quality of illuminating-gas will only require about one-fifth the fuel to heat them that would be required in the old method, in order to decompose and combine the small remaining quantity of oil or carbureting-fluid required to bring the gas to the desired candle-power and quality. Furthermore, the extent of heated surface required to decompose in a given time one gallon of oil or fluid per thousand feet of gas would be much less than that required to decompose five gallons per thousand feet of gas carbureted and fixed. It is therefore evident that I obtain a saving in the extent and cost of the plant or works and a large saving of the fuel required for heating the retorts.

In order to clearly set forth the details of the operation of my process, I will describe it in connection with the accompanying drawing, which represents an apparatus suitable for carrying out the process. The drawing represents the cupola-generator in vertical section and the connecting-holder, the carburetor, and the bench of fixing-retort in elevation.

The generating-cupola A is constructed of brick, covered with a tight jacket of plate-iron, and is divided near its middle portion by an arched partition, $a$, into two principal chambers, the upper one, B, being the fuel and generating chamber for water-gas, and the lower one, C, being the carbureting and fixing chamber. The generating-chamber is provided with the usual grate and ash-pit, with which connects the air-blast pipe N and the steam-pipe S, and has at the top a fuel-feeding opening covered by a tight-fitting lid. One or more flues, $b$, for gas and products of combustion pass through the walls of chamber B, connecting the top thereof with the top of chamber C, and the oil-supply pipe $o$ opens into one of these flues. The chamber C is filled with refractory brick laid in the form used in regenerator-chambers, supported upon the arch $c$, near the bottom. Connecting with the chamber below arch $c$ is a pipe, D, having a tight-fitting lid to close its outer end, and serving for the escape of products of complete combustion; also, connecting with this chamber is the gas-outlet pipe E, which connects with the seal-box H, dipping into the water therein. A pipe, F, connects the seal-box with the governing-holder G for the mixed or low grade gas. Pipe I conducts gas from the holder to carburetor K, from which it is supplied by pipe $k$ to the retort $l$ in furnace L. Any required number of benches of retorts are employed.

The carburetor may be provided with communicating trays for holding the hydrocarbon fluid and the gas to be carbureted passed over the trays in the usual manner.

In order to manufacture gas, the cupola-generator is first heated up by admitting a blast of air to the bed of fuel in chamber B till it is raised to a state of incandescence, and by burning the hot gaseous products given off from the fuel and passed down through flues $b$ in the fixing-chamber C, a blast of air being supplied for that purpose through a pipe near the top of the chamber. The products of complete combustion impart their heat to the regenerator brick-work, and finally, when spent, pass off through pipe D, its lid being open at that time for the purpose. The bed of fuel in the generating-chamber and the refractory brick-work in the fixing-chamber having been heated to the proper temperature, the air-blasts are shut off and the lid of pipe D is tightly closed. Steam is now admitted to and decomposed in the incandescent fuel, resulting in the production of hydrogen and carbonic oxide, which pass through flues $b$ into fixing-chamber C. Oil for carbureting the gases is supplied to one of the flues, and is vaporized by the passing gas, which carries the vapors into the top of chamber C, where the gases entering from the other flues are enriched. The carbureted gases, in passing down through the refractory brick-work, are combined and converted into a fixed illuminating-gas, which is passed through the water-seal to holder G, and it is thence passed in a regulated stream, and, if desired, under a controlled pressure, into the carburetor, where it is enriched or carbureted to the required degree, after which it is passed through the heated retorts, which are maintained at a uniform temperature, and is therein converted into a fixed illuminating-gas of the finest quality. The gas, after leaving the retorts, is purified and stored in the distributing-holder. In order to control the flow of gas from the holder to the carburetor, as to quantity and pressure, a valve and a pressure-regulator should be inserted in the connecting-pipe.

Having described my invention, what I claim, and desire to secure by Letters Patent, is—

1. The process of manufacturing illuminating-gas, which consists in raising a body of fuel to a state of incandescence by means of a current of air, burning the resulting hot gaseous products and storing the heat thereof in a fixing-chamber, then decomposing steam in the bed of heated fuel, carbureting the resulting gas while hot, and combining and fixing it in the heated fixing-chamber, so as to utilize the heat stored from the waste gaseous products, storing the resulting mixed or low grade illuminating-gas in a holder, and finally withdrawing it from the holder and adding sufficient oil or vapor to raise it to the desired candle-power, and fixing it in a heated chamber.

2. The process of manufacturing illuminating-gas, which consists in the raising a body of fuel to incandescence by an air-blast, and by means of the resulting hot gaseous products heating up a fixing-chamber, then decomposing steam in the body of incandescent fuel, carbureting the resulting hot hydrogen and carbonic-oxide gases, combining and fixing the gases and vapors in the heated fixing-chamber, and storing the fixed gas without regard to candle-power in a holder, then withdrawing and passing this mixed-grade gas to a carburetor, where hydrocarbon is added in sufficient quantity to raise the gas to the desired candle-power, and finally converting it into a homogeneous fixed gas of fine quality in a separate heated chamber.

In testimony that I claim the foregoing as my own I have affixed my signature in presence of two witnesses.

THEODORE G. SPRINGER.

Witnesses:
DANIEL N. HAGADORN,
C. HODGE HUDSON.